US011308142B2

(12) United States Patent
Karri et al.

(10) Patent No.: US 11,308,142 B2
(45) Date of Patent: Apr. 19, 2022

(54) AUTOMATIC RESUME PROCESSING SYSTEM

(71) Applicant: International Business Machines Corporation, Armonk, NY (US)

(72) Inventors: Venkata Vara Prasad Karri, Visakhapatnam (IN); Shailendra Moyal, Pune (IN); Amit Kumar Senapaty, Visakhapatnam (IN); Akash U. Dhoot, Pune (IN)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 16/536,861

(22) Filed: Aug. 9, 2019

(65) Prior Publication Data

US 2021/0042342 A1  Feb. 11, 2021

(51) Int. Cl.
*G06F 40/205* (2020.01)
*G06F 16/35* (2019.01)
*G06K 9/00* (2022.01)
*G06F 16/93* (2019.01)
*G06F 16/31* (2019.01)
*G06F 16/81* (2019.01)
*G06F 40/30* (2020.01)

(52) U.S. Cl.
CPC .......... *G06F 16/353* (2019.01); *G06F 16/328* (2019.01); *G06F 16/81* (2019.01); *G06F 16/93* (2019.01); *G06F 40/205* (2020.01); *G06F 40/30* (2020.01); *G06K 9/00463* (2013.01); *G06K 9/00469* (2013.01)

(58) Field of Classification Search
CPC ...... G06F 16/353; G06F 40/205; G06F 40/30; G06F 16/81; G06F 16/93; G06F 16/328; G06F 16/30; G06F 16/80; G06F 40/10; G06F 40/20; G06K 9/00469; G06K 9/00463
See application file for complete search history.

(56) References Cited

U.S. PATENT DOCUMENTS

| | | | |
|---|---|---|---|
| 2007/0203776 A1* | 8/2007 | Austin | G06Q 10/00 705/321 |
| 2009/0276209 A1* | 11/2009 | Dane | G06Q 10/063 112 704/9 |
| 2013/0066795 A1 | 3/2013 | Katz et al. | |
| 2014/0122355 A1* | 5/2014 | Hardtke | G06Q 10/105 705/321 |
| 2014/0278633 A1* | 9/2014 | Daly | G06Q 10/1053 705/7.14 |

(Continued)

FOREIGN PATENT DOCUMENTS

| | | |
|---|---|---|
| CN | 108846293 A | 11/2018 |
| CN | 109086585 A | 12/2018 |

*Primary Examiner* — Sanchita Roy
(74) *Attorney, Agent, or Firm* — Yee & Associates, P.C.

(57) ABSTRACT

A method, apparatus, system, and computer program product for processing electronic resumes. Classifications are identified for sections in the electronic resume. Resume classification codes are associated with the sections based on the classifications identified, wherein the resume classification codes enable matching the electronic resume to a job opening. Visibility codes are generated for the sections. The visibility codes enable selective viewing of the sections.

14 Claims, 10 Drawing Sheets

(56) References Cited

U.S. PATENT DOCUMENTS

| | | | |
|---|---|---|---|
| 2015/0317610 A1* | 11/2015 | Rao | G06Q 10/1053 |
| | | | 705/321 |
| 2016/0232160 A1* | 8/2016 | Buhrmann | G06F 16/248 |
| 2017/0344555 A1* | 11/2017 | Yan | G06Q 50/01 |
| 2018/0308062 A1* | 10/2018 | Quitmeyer | G06Q 10/1053 |
| 2019/0325399 A1* | 10/2019 | Obeid | G06Q 10/105 |
| 2020/0065769 A1* | 2/2020 | Gupta | G06Q 10/1053 |
| 2020/0349177 A1* | 11/2020 | Maan | G06F 16/383 |
| 2021/0157975 A1* | 5/2021 | Gelosi | G06F 40/30 |

* cited by examiner

| JOB PROFILE CODE | VALUE |
|---|---|
| JOB TITLE | JT |
| JOB DESCRIPTION | JD |
| RESPONSIBILITIES | JR |
| SKILLS AND EXPERIENCE | JRSXP |
| REQUIRED TECHNICAL AND PROFESSIONAL EXPERTISE | JRTPXP |
| PREFERRED TECHNICAL AND PROFESSIONAL EXPERIENCE | JPTPXP |
| EDUCATION | JDE |
| REQUIRED EDUCATION | JRED |
| PREFERRED EDUCATION | JPED |
| ELIGIBILITY REQUIREMENTS | JER |
| JOB CATEGORY | JC |

| RESUME CLASSIFICATION CODE | VALUE |
|---|---|
| WORK EXPERIENCE | RXP |
| SKILLS | RSK |
| TECHNICAL SKILLS | RXPTS |
| FUNCTIONAL SKILLS | RXPFS |
| MANAGEMENT SKILLS | RXPMS |
| EDUCATION | RED |
| GRADUATE | REDG |
| PG | REDPG |
| PHD | REDPHD |
| LANGUAGES | RLN |
| INTEREST | RIN |
| PROJECTS | RPJ |
| ORGANIZATIONS | ROG |
| COURSES AND CERTIFICATION | RCOX |
| TECHNICAL | RCOXT |
| FUNCTIONAL | RCOXF |
| HONORS AND AWARDS | RHA |
| VOLUNTEER EXPERIENCE | RVEX |

✉ jane.doe@gmail.com  📱 920-55554512  📍 Copenhagen  ⊖ jane-doe.com  ⊙ JKLcomany.com/jane.doe

WORK EXPERIENCE

Intern Architect
ABC Company                                    602
*07/2016 - 06/2017*
*Achievements/Tasks*
- Developed and executed online, social media and print marketing strategies for the new projects.
- Participated in all phases of the design and construction processes on 6 major projects nationally and internationally.
- Produced drawings and layouts and assisted the clients throughout the projects. Clients had a satisfaction rate of over 95%.
- Created 3d models, renderings and video animations.

EDUCATION

MSc Space Syntax: Architecture and Cities
Smith School of Architecture (DEF)             606
*08/2014 - 06/2016*
*(DEF Architecture Department Excellence Award Winner)*
- Spatial Dynamics and Computation
- Architectural Phenomena
- Buildings, Organizations and Networks
- Design as a Knowledge-Based Process

PROJECTS

GHI Company Affordable Housing Project:
Assembling Sustainable Communities with        608
Insulating Concrete Forms (06/2016) ↗
- The jury called this design "handsome and sophisticated" and commended it on its demonstration of the ease of its construction. The project also demonstrated many options for the use of vinyl.

The S House: A Passive House (09/2015) ↗
- The form, structure and mechanical features of the building are integrated into a single shell. For example, the louvers also act as a screen along the facade of the building.

FUNCTIONAL SKILLS                          620

Presentation & Public Speaking    ■ ■ ■ ■ ■
Active Listening                  ■ ■ ■ ■ ■
Perseverance                      ■ ■ ■ ■ ■
Teamwork                          ■ ■ ■ ■ ■
Written & Oral Communication      ■ ■ ■ ■ □
Creativity & Problem Solving      ■ ■ ■ ■ □

TECHNICAL (IT) SKILLS

Graphics                                   622
Hand Drafting, Sketching,
MNO Company CAD Software,
PQR Company Creative Cloud Suite

Bim & 3d Modeling
Sketcher Pro, US Pedistal,
MNO Company Revealer

Platforms
XYZ & XSO Operating Systems,
PQR Company Office, VWX
Company Drive/Docs

Other
Basic Web Development, Model Building, Darkroom Techniques, Professional level Digital + Film Photography

604

LANGUAGES
English    ■ ■ ■ ■ ■
Danish     ■ ■ ■ □ □         610
German     ■ ■ ■ □ □
Spanish    ■ ■ □ □ □

INTERESTS                                  612
[Artificial Intelligence]
[Virtual Reality] [Chess]

FIG. 7

Admin Executive /-702

123 Healthcare India LLP - Pune Patel

Apply Now  

- Keep a track of Housekeeping, Stationary and other material and prepare Purchase Order as per requirement.
- Take approval from VP-HR&Admin before placing any purchase order
- Maintain & Update Inventory MIS on daily basis and reconcile the statement with actual stock every Saturday.
- Monitor office material supply and research for getting advantageous deals / vendors

/-704

Responsibilities and Duties

Desired Experience: Minimum 3-5 years of experience in Admin & Transport function /-706

Required Experience and Qualifications

Required Experience, Skills and Qualifications

Qualification

- Any Graduate
- Good knowledge of city routes
- Ready to work in night shifts
- Good PQR Company Office experience
- Effective Communication skills
- Desired Experience: Minimum 3-5 years of experience in Admin & Transport function

Benefits
Other Details: 708

- Salary - As per Industry Standards (based on experience)
- Rotational Shift
- 6 days working
- No fixed Off
- Candidate should have bicycle.

Job Type: Full-time ⎫-712

Education:
- Secondary(10th Pass) (Preferred) ⎬-710

AUTOMATIC RESUME PROCESSING SYSTEM

BACKGROUND

1. Field

The present disclosure relates generally to an improved computer system and more specifically to a method, apparatus, system, and computer program product for processing electronic resumes.

2. Description of the Related Art

In filling positions, organizations often post job openings for these positions. The organizations can be, for example, a company, a charity, a financial institution, a government agency, a manufacturing company, or some other type of organization. Organizations can post job openings on employment websites. As another example, organizations can engage recruiters to search for potential applicants to fill the job openings.

Applicants searching for jobs will submit resumes for consideration by organizations. A resume is a document created to present the background, skills, and accomplishments of the applicant. A resume contains information about employment experience, education, skills, and other information that can be used to evaluate an applicant for a job opening. These resumes can be submitted to organizations, employment websites, recruiters or some combination thereof for consideration.

In some cases, applicants send the same resume regardless of how well education and experience of the applicants match the job requirements for the job openings. In other cases, applicants tailor their resumes to a particular job profile for a job opening that they would like to fill.

Organizations and recruiters often receive hundreds or thousands of resumes for a job opening. The resumes are reviewed to determine whether the background, skills, and accomplishments of candidates meet the criteria for the job opening.

Although the job openings often specify what skills, education, and experience are desired or required for a job opening, candidates will often submit resumes even though their skills, education, and experience do not meet the requirements for the job opening. Reviewing these resumes to determine which candidates should receive further consideration or interviews can be time consuming.

Many organizations, recruiters and employment websites use applicant tracking systems (ATSs). Application tracking systems are used to electronically manage applications from candidates for job openings. For example, automatic tracking systems can receive and store resumes received from applicants. Further, the systems can also be used to manage the resumes during the review process. The systems can also implement a workflow for reviewing resumes. Processing a large number of resumes can be more time-consuming and difficult than desired even when using applicant tracking systems.

SUMMARY

According to one embodiment of the present invention, a method processes an electronic resume. Classifications are identified for sections in the electronic resume. The classifications are based on content in the sections. Resume classification codes are associated with the sections based on the classifications identified, wherein the resume classification codes enable matching the electronic resume to a job opening. Visibility codes are generated for the sections. The visibility codes enable selective viewing of the sections. The resume classification codes are associated with corresponding sections in the electronic resume.

According to another embodiment of the present invention, a resume management system comprises a computer system that identifies classifications for sections in an electronic resume. The classifications are based on content in the sections. The computer system associates resume classification codes to the sections based on the classifications identified. The resume classification codes enable matching the electronic resume to a job opening. The computer generates visibility codes for the sections. The visibility codes enable selective viewing of the sections. The computer system associates the resume classification codes with corresponding sections in the electronic resume.

According to yet another embodiment of the present invention, a computer program product for processing an electronic resume in which the computer program product comprises a computer-readable-storage media with first program code, second program code, third program code, and fourth program code stored on the computer-readable storage media. The first program code is run to identify classifications for sections in the electronic resume. The classifications are based on content in the sections. The second program code is run to associate resume classification codes to the sections based on the classifications identified. The resume classification codes enable matching the electronic resume to a job opening. The third program code is run to generate visibility codes for the sections. The visibility codes enable selective viewing of the sections.

BRIEF DESCRIPTION OF THE DRAWINGS

FIG. 4 is a table of resume classification codes in accordance with an illustrative embodiment;

FIG. 6 is an illustration of a resume in accordance with an illustrative embodiment;

FIG. 7 is an illustration of a job opening in accordance with an illustrative embodiment;

DETAILED DESCRIPTION

Figure 1:
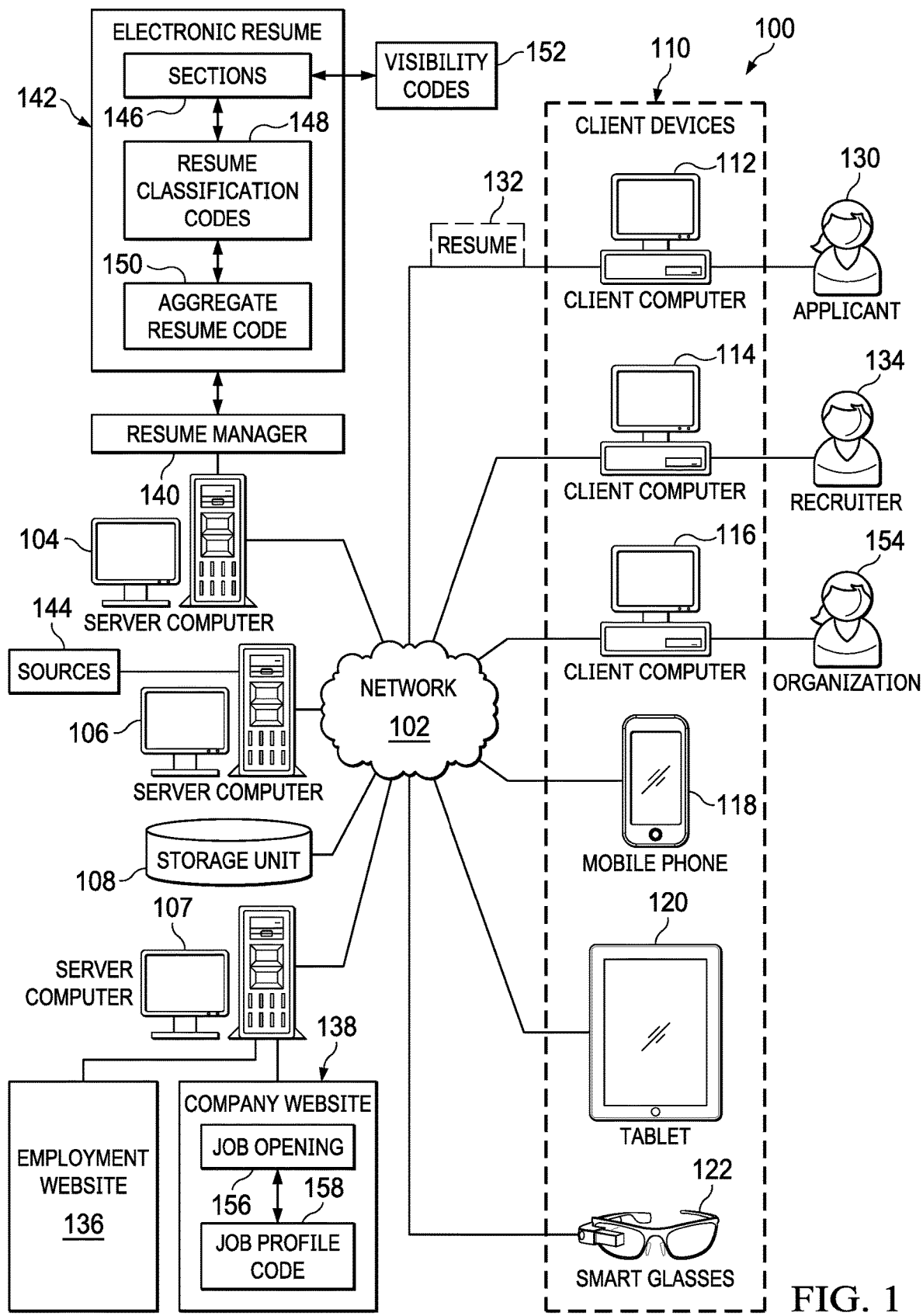
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that it is difficult for organizations to identify appropriate candidates from resumes submitted for job openings. The illustrative embodiments recognize and take account that while the use of applicant tracking systems can help review and organize resumes, the use of applicant tracking systems still result in many resumes being received for job openings in which the resumes do not meet the minimum requirement or standards for the job openings. Thus, the illustrative embodiments recognize and take account that it would be desirable to have a method, apparatus, system, and computer program product that take into account these issues when processing resumes for job openings.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104, server computer 106, and server computer 107 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, server computer 107, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, applicant 130 at client computer 112 is a person who is searching for a job opening. In this illustrative example, applicant 130 has resume 132 for use in applying for a job opening. As depicted, resume 132 is an electronic document that includes information about the background, skills, education, experience, accomplishments, and other information about applicant 130.

As depicted, applicant 130 can work with recruiter 134 to search for a position. In other illustrative examples, applicant 130 can submit resume 132 to organizations through employment website 136 or to company website 138. As depicted in this illustrative example, both websites are hosted on server computer 107. In other illustrative examples, these websites can be hosted on different computers in different locations.

In this illustrative example, employment website 136 is a website that is specific for employment or careers. This type of website allows supporters to post job openings and for applicant to submit resumes for perform research on organizations. Company website 138 is for an organization and can also receive resumes or applications for job openings.

In this illustrative example, regardless of where applicant 130 sends resume 132 for submission for a job opening, resume 132 can be processed by resume manager 140. In this illustrative example, resume manager 140 creates electronic resume 142 from resume 132. Electronic resume 142 comprises resume 132 and can be stored in a form for processing by resume manager 140. In other words, electronic resume 142 includes the information in resume 132 but is stored in a protocol or form used by resume manager 140. For example, resume 132 can be stored as electronic resume 142 using an extensible markup format (XML) or some other suitable format.

Further, electronic resume 142 can include information from a number of sources 144. For example, applicant 130 can also include an identification of the number of sources 144 that also include information about applicant 130.

As depicted, the number of sources 144 can include an online social network for professional relationships or social relationships. For example, the number of sources 144 can include at least one of LinkedIn, Facebook, or other social networking websites. Further, the number of sources 144 can also include university websites, repositories for publications, or for other sources for documents and information authored by applicant 130.

In this illustrative example, resume manager 140 can identify classifications for sections 146 in resume 132. The classifications are based on content in sections 146. The classifications for sections 146 can include at least one of work experience, skill set, education, or other suitable types of information.

Resume manager 140 associates resume classification codes 148 with sections 146 based on the classifications identified for sections 146. In this illustrative example, resume classification codes 148 enable matching electronic resume 142 to a job opening. Additionally, resume manager 140 can determine aggregate resume code 150 for electronic resume 142. Aggregate resume code 150 can be determined using resume classification codes 148 for electronic resume 142.

Further, resume manager 140 generates visibility codes 152 for sections 146. In this illustrative example, visibility codes 152 enable selective viewing of sections 146. Each section in sections 146 can be associated with a visibility code in visibility codes 152. The visibility code for a particular section indicates whether the section can be seen when electronic resume 142 is sent for review.

In the illustrative example, the visibility can be with respect to a person or a software process. In other words, a person may not be able to view certain sections in electronic resume 142. In a similar fashion, a software process receiving electronic resume 142 may not be able to analyze or process selected sections. The sections that are not visible or can be omitted in version of electronic resume that is submitted.

When working with recruiter 134, applicant 130 may apply for sensitive job openings and may only desire limited access to view skills in skills section. The visibility of one or more skills can be controlled by associating a visibility code to the skills section or to subsections in the skills section. The visibility codes can be changed depending on which organizations receive electronic resume 142.

For example, applicant 130 can work with recruiter 134 at client computer 114. Recruiter 134 can receive electronic resume 142 from resume manager 140 and view electronic resume 142 at client computer 114. The visibility of sections 146 can be set such that recruiter 134 is unable to see some skills in sections 146. This ability to see skills does not hinder matching applicant 130 to a job opening 156.

In this illustrative example, organization 154 at client computer 116 posts job opening 156 on company website 138. Job opening 156 includes job profile code 158. As depicted, job profile code 158 is similar to aggregate resume code 150 and is based a job description for job opening 156.

A determination is made as to whether aggregate resume code 150 matches job profile code 158. In this illustrative example, the match is present when a match occurs between the difference in aggregate resume code 150 and job profile code 158. In this example, a match can be determined using a data structure that maps aggregate resume codes to and job profile codes. As depicted, more than one aggregate resume code can map to a job profile code, resulting in a match. When aggregate resume code 150 matches job profile code 158, a match is present between electronic resume 142 and job opening 156. This comparison of aggregate resume codes to and job profile codes can be performed regardless of the visibility of different sections in electronic resume 142.

If organization 154 desires to proceed with applicant 130, through user input received from applicant 130, organization 154 may ask to view additional details in electronic resume 142. In this illustrative example, visibility codes 152 can be changed or modified by resume manager 140 to enable viewing of more of sections 146 in electronic resume 142 by organization 154 using client computer 116.

The modification of visibility codes can be initiated by applicant 130 providing user input to resume manager 140. In some illustrative examples, visibility codes 152 can be managed by resume manager 140 using a policy containing rules indicating when different sections of electronic resume 142 can be viewed. For example, the policy can define what sections in sections 146 can be viewed based on at least one of the recipients of electronic resume 142, an application stage, a particular type of job opening, particular type of employer, or some other suitable criteria.

In another example, recruiter 134 may ask for permission from the candidate for at least one of recruiter 134 or organization 154 to view additional details in electronic resume 142 depending on requirements for job opening 156.

Thus, with the processing of electronic resume 142 by resume manager 140, time and effort can be saved in determining what resumes should be reviewed by human users or otherwise further processed for a job opening. In one illustrative example, job profile codes can be published by organizations such that potential applicants can quickly check for matches and upload their resumes. In this manner, the use of resume classification codes and aggregate resume codes that can be checked with job profile codes can save time and effort checking the eligibility of candidates. In this manner, time and effort can be saved for both potential candidates and organizations using resume manager 140.

Further, the use of visibility codes can provide a secure way to handle resumes for various types of job openings which may have sensitive roles such as those in the defense industry for executive level position. The visibility codes can also maintain confidentiality of applicants in situations such as mass hiring for job openings. These types of mass hiring can occur at campus job entry-level positions for other job figures for laterals. The use of visibility codes can reduce the amount of exposure of information that may be sensitive to a particular applicant. These types sections giving a physical using any private security channel between an applicant and organization.

In the different illustrative examples, personal or confidential information for an applicant can be collected from the applicant only when the applicant has provided consent for the collection and sharing of the information. In this illustrative example, the consent is obtained ahead of time with the proper disclosure and consent forms for privacy rules and regulations. In the illustrative example, personal confidential information is not collected or shared unless an applicant has opted in to share the information. Further, any other personal information about the applicant is not collected or shared without the applicant opting in by providing consent to the collection and use of the personal information.

Figure 2:
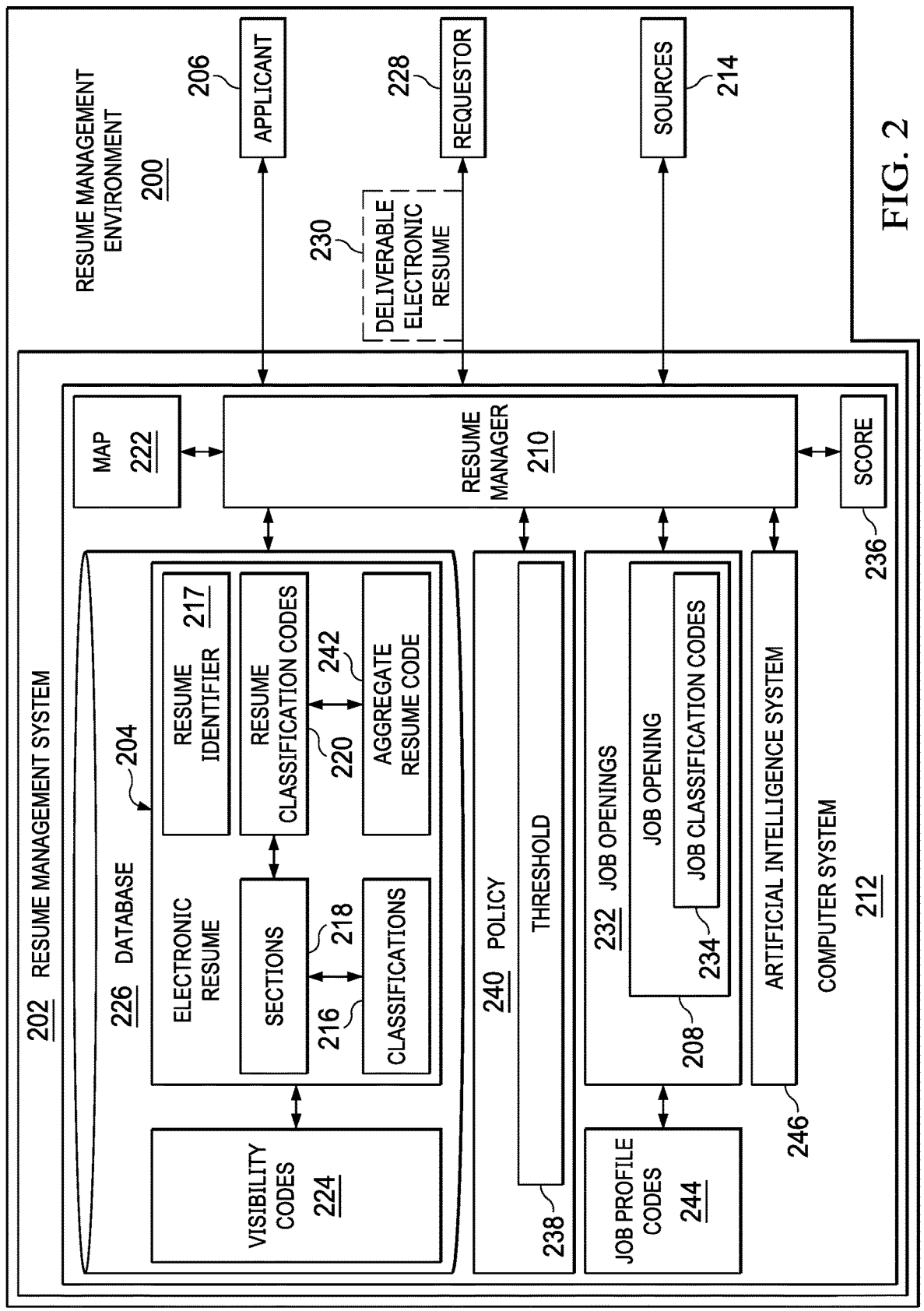
FIG. 2 is a block diagram of a resume management environment in accordance with an illustrative embodiment.

With reference now to FIG. 2, a block diagram of a resume management environment is depicted in accordance with an illustrative embodiment. In this illustrative example, resume management environment 200 includes components that can be implemented in hardware such as the hardware shown in network data processing system 100 in FIG. 1.

As depicted, resume management system 202 in resume management environment 200 can operate to process electronic resume 204 for applicant 206. In this illustrative example, electronic resume 204 includes information about applicant 206 that is used in evaluating applicant 206 for job opening 208.

In this illustrative example, resume management system 200 includes a number of different components. As depicted, resume management system 200 comprises resume manager 210 in computer system 212.

Resume manager 210 can be implemented in software, hardware, firmware or a combination thereof. When software is used, the operations performed by resume manager 210 can be implemented in program code configured to run on hardware, such as a processor unit. When firmware is used, the operations performed by resume manager 210 can be implemented in program code and data and stored in persistent memory to run on a processor unit. When hardware is employed, the hardware may include circuits that operate to perform the operations in resume manager 210.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

In this illustrative example, resume manager 210 is configured to perform a number of different steps in processing electronic resume 204. As depicted, electronic resume 204 can be derived or obtained from a number of sources 214. For example, a source in the number of sources 214 can be a resume document received from applicant 206. Further, the number of sources 214 for electronic resume 204 can also include information obtained from a social networking website, a document repository, an academic website, a file transfer protocol (FTP) server, or some other source that can provide information about applicant 206.

In this illustrative example, resume manager 210 can receive information for applicant 206 from a number of sources 214. In other illustrative examples, resume manager 210 can retrieve this information with permission from applicant 206.

In the different illustrative examples, personal or confidential information for an applicant can be collected from the applicant only when the applicant has provided consent for the collection and sharing of the information. In this illustrative example, the consent is obtained ahead of time with the proper disclosure and consent forms for privacy rules and regulations. In the illustrative example, personal confidential information is not collected or shared unless an applicant has opted in to share the information. Further, any other personal information about the applicant is not collected or shared without the applicant opting in by providing consent to the collection and use of the personal information.

As depicted, resume manager 210 identifies classifications 216 for sections 218 in electronic resume 204. In the illustrative example, classifications 216 are based on content in sections 218. For example, if a section has content describing skills for applicant 206, the section is classified as skills.

Resume manager 210 associates resume classification codes 220 to sections 218 based on classifications 216 identified for sections 218. In this example, resume classification codes 220 enable matching electronic resume 204 to job opening 208.

Resume manager 210 can use artificial intelligence system 246 to identify classifications 216 for sections 218 in electronic resume 204. In this illustrative example, Artificial intelligence system 246 is a system that has intelligent behavior and can be based on the function of the human brain. An artificial intelligence system comprises at least one of an artificial neural network, a cognitive system, a Bayesian network, fuzzy logic, an expert system, a natural language system, or some other suitable system. Machine learning is used to train the artificial intelligence system. Machine learning involves inputting data to the process and allowing the process to adjust and improve the function of the artificial intelligence system. A cognitive system is a computing system that mimics the function of a human brain.

In this example, artificial intelligence system 246 has been trained to identify and classify sections in resumes and to identify and categorize sections in job openings. This training can be performed using currently available machine learning techniques including at least one of a supervised learning algorithm, an unsupervised learning algorithm, or a reinforcement learning algorithm.

Resume manager 210 also associates resume classification codes 220 with corresponding sections in sections 218 in electronic resume 204. This association can be made in a number of different ways. For example, resume classification codes 220 can be embedded in electronic resume 204 in the corresponding sections. In another illustrative example, resume classification codes 220 can be stored as metadata with pointers to corresponding sections in electronic resume 204.

Resume classification codes 220 can be included as part of electronic resume 204. For example, resume classification codes 220 may be placed or embedded as metadata in electronic resume 204. In another illustrative example, resume classification codes 220 can be stored in a separate a data structure or metadata that is pointed to the electronic resume 204. Each section in sections 218 that has been classified is associated with a resume classification code in resume classification codes 220. In this illustrative example, resume classification codes 220 can include at least one of experience, skill, education, language, interest, a project, an organization, a course, a certification, an award, an honor, or other categories of information in electronic resume 204.

Further, resume manager 210 can also generate visibility codes 224 for sections 218 in electronic resume 204. In this illustrative example, visibility codes 224 enable selective viewing of sections 218. In the illustrative example, sections 218 in electronic resume 204 can be stored in an encrypted format. Further, visibility codes 224 can be embedded or stored in a manner that references or is otherwise associated with sections 218. Thus, visibility codes 224 can be used to control when particular sections in sections 218 are visible. As depicted, not all of sections 218 are required to have visibility codes 224. For example, one or more of sections 218 may not be associated with visibility codes 224. In this case, those sections are visible by default.

In this illustrative example, electronic resume 204 can be stored by resume manager 210 in resume database 226 with other electronic resumes. When requested by requestor 228, resume manager 210 can generate deliverable electronic resume 230 from electronic resume 204 based on visibility codes 224 assigned to sections 218 in electronic resume 204. In this illustrative example, requestor 228 can be a recruiter, an organization, an employment website, or some other suitable person or process that requests resumes.

Further, resume manager 210 can assign resume identifier 217 to electronic resume 204. In this illustrative example, resume identifier 217 uniquely identifies electronic resume 204 as being for applicant 206.

In this depicted example, deliverable electronic resume 230 includes only sections 218 that are indicated as visible by visibility codes 224. In other illustrative examples, all sections 218 can be included in deliverable electronic resume 230. The sections, however, are encrypted and can only be viewed if the corresponding visibility codes visibility codes 224 include a key to decrypt the corresponding sections.

With resume classification codes 220 associated with sections 218, electronic resume 204 can be compared with job openings 232 to find job opening 208 in job openings 232 using resume classification codes 220. For example, resume manager 210 can compare resume classification codes 220 for electronic resume 204 to job classification codes 234 for job opening 208.

In the illustrative example, the comparison can be by resume manager 210 using map 222. As depicted, map 222 is a data structure that defines what resume classification codes correspond to particular job classification codes. In other words, a determination of which of resume classification codes 220 in electronic resume 204 map to job classification codes 234 in job opening 208 can be made by resume manager 210 using map 222.

As depicted, job classification codes 234 can be used to identify or categorize requirements in a job description for job opening 208. A job description is a description of a job that can include general tasks, duties and responsibilities for the position. Further, the job description can also include qualifications, skills, experience, and education that is desired or required for the position. Job classification codes 234 can include codes for at least one of a title, a job description, a responsibility, a skill, an experience, an education requirement, an eligibility requirement, a job category, or other categories of information in job opening 208.

In this illustrative example, resume manager 210 can generate score 236 based on how many of resume classification codes 220 map to job classification codes 234. Further, resume manager 210 can generate deliverable electronic resume 230 based on the visibility codes 224 when score 236 reaches a threshold 238. In this illustrative example, threshold 238 can be defined in policy 240. Policy 240 is a set of rules and can include data used to apply the rules.

For example, policy 240 can include a rule stating that a threshold is met if all requirements in job classification codes 234 match resume classification codes 220 and a selected number of other resume classification codes 220 match job classification codes 234. The number of matches defined in policy 240 can be a default number or can be selected by at least one of an organization or a recruiter. Resume manager 210 returns deliverable electronic resume 230 to requestor 228.

In the illustrative example, the matching of resume classification codes 220 can be performed indirectly through aggregate resume code 242 generated for electronic resume 204. For example, resume manager 210 generates aggregate resume code 242 based on resume classification codes 220. As depicted, aggregate resume code 242 enables matching electronic resume 204 with job opening 208 having corresponding job profile code 244.

In this illustrative example, resume manager 210 or some other process can generate job profile codes 244 for job opening 232. These job profile codes are designed to correspond to aggregate resume codes when the general match is present. For example, a match is present when skills for an applicant include engineering experience and an engineering degree and when the job opening includes responsibilities, tasks and degree requirements relating to the same engineering background.

By using aggregate resume code 242 and job profile codes 244, resume manager 210 can perform initial filtering and processing of electronic resumes before actually comparing resume classification codes to job classification codes. In other words, comparison of resume classification codes and job classification codes is not needed unless a match is present between an aggregate resume code and a job profile code. In this manner, resume manager 210 operates to improve the operation of computer system 212 through reducing the amount of processing time needed to process resumes.

In this illustrative example, resume manager 210 compares aggregate resume code 242 for electronic resume 204 with job profile codes 244 for job openings 232. Resume manager 210 matches electronic resume 204 to a set of job openings 232 with a set of job profile codes 244 that correspond to aggregate resume code 242.

Deliverable electronic resume 230 can be generated from electronic resume 204 and sent to organizations or recruiters for the set of job openings 232 that match electronic resume 204. Additionally, a notification can be sent to applicant 206 indicating the occurrence of the matches. Applicant 206 can return user input to resume manager 210 that indicates whether to actually submit electronic resume 204 for particular job openings in job openings 232.

In another illustrative example, applicant 206 can include information in sections 218 that can apply to different types of job openings 232. All this information can be placed in electronic resume 204 without applicant 206 needing to generate multiple versions. Applicant 206 can interact with resume manager 210 to generate a specific electronic resume for a particular job opening using electronic resume 204.

For example, resume manager 210 can identify job classification codes 234 for job opening 208. Job opening 208 can be a job opening that is selected as being of interest to applicant 206. Resume manager 210 generates deliverable electronic resume 230 using resume classification codes 220 in electronic resume 204 that correspond to job classification codes 234. These visibility codes for these sections can be set for visible deliverable electronic resume 204 that is generated using electronic resume 204. As a result, deliverable electronic resume 230 is tailored to job opening 208.

For example, applicant 206 may have skills that include video editing, composite stress analysis, operating system development, and intrusion detection software. If job opening 208 is for a cybersecurity position, the job classification codes for this position may result in a match for resume classification codes that correspond to operating system development and intrusion detection software. As a result, a deliverable electronic resume will include these skills and not include video editing and composite stress analysis.

Figures 3, 5:
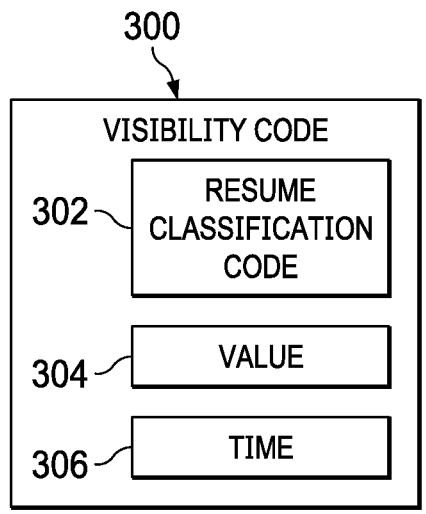
FIG. 3 is a block diagram of a visibility code in accordance with an illustrative embodiment.
FIG. 5 is a table of job classification codes in accordance with an illustrative embodiment.

Turning to FIG. 3, a block diagram of a visibility code is depicted in accordance with an illustrative embodiment. In this depicted example, visibility code 300 is an example of one manner in which visibility codes 224 in FIG. 2 can be implemented. As depicted, visibility code 300 is a key value pair comprising resume classification code 302 for a section in an electronic resume and value 304 indicating whether the section in the electronic resume is visible. Visibility code 300 can be generated by at least one of resume manager 210 or a user such as applicant 206.

Resume classification code 302 identifies the section for which visibility code 300 is applicable. Value 304 is a value that determines whether the section is visible. For example, the value can be a flag indicating whether the section is visible. In another illustrative example, the value can be a null value or some other selected value when the section is not visible. The value can be a key when the section visible. The key can be, for example, an encryption key or a password if the section is encrypted.

Further, visibility code 300 can also include time 306. Time 306 is an optional parameter that controls visibility of a section based on time. For example, the visibility can change after the period of time expires or after some period of time has passed. The visibility can also be controlled based on dates or ranges of dates. At that time, the visible codes change to make the section unavailable for review. The control of visibility can also be based on dates or ranges of dates.

In one illustrative example, one or more technical solutions are present that overcome a technical problem with the time required and difficulty in processing resumes. As a result, one or more technical solutions may provide a technical effect automatically processing resumes to add metadata classifying sections of the resumes in a manner such that the resumes can be compared to job openings. An illustrative example can provide one or more technical solutions that allow automatically comparing resumes that have been classified to a job opening. In the illustrative example, one or more technical solutions are present that use classification codes rather than matching words to determine whether information in a resume meets the requirements for a job.

Additionally, with the use of resume classification codes 220 and visibility codes 224, electronic resume 204 can be stored in a database that can be searched. With the use of visibility codes 224, one or more of sections 218 can be hidden from view unless a particular requestor is authorized to review the sections. As a result, copying of resumes can be reduced through limited visibility of sections in the resumes using visibility codes. For example, if applicant 206 submits electronic resume 204 to a recruiter, the recruiter receives deliverable electronic resume 230. This resume may have many sections in sections 218 that are not visible to the recruiter based on visibility codes 224. As a result, other persons who may have access to receive deliverable electronic resume 230 are unable to copy or use sections that have been hidden from view.

Applicant 206 can enable viewing additional or all of sections 218 when undesired. For example, the recruiter may send deliverable electronic resume 232 and a potential employer. Based on viewing the visible sections in deliverable electronic resume 230 and matches between job profile codes 244 and job classification codes 234, the employer may desire to see the additional sections that are currently not visible. In this case, applicant 206 can communicate with the potential employer and generate a new deliverable electronic resume in which additional or all of sections 218 are visible to the potential employer. Thus, copying of resumes can be reduced through the use of visibility codes to limit access to sections in resumes. For example, particular sections in sections 218 that applicant 206 feels should have limited viewing can be controlled by setting visibility codes 224 assigned to those particular sections in electronic resume 204.

Computer system 212 can be configured to perform at least one of the steps, operations, or actions described in the different illustrative examples using software, hardware, firmware or a combination thereof. As a result, computer system 212 operates as a special purpose computer system in which resume manager 210 in computer system 212 enables automatically classifying information in resumes and from other sources to form in an electronic resume that can be compared to job descriptions for accurate as compared to currently. In particular, resume manager 210 transforms computer system 212 into a special purpose computer system as compared to currently available general computer systems that do not have resume manager 210.

In the illustrative example, the use of resume manager 210 in computer system 212 integrates processes into a practical application for method preamble processing resumes that increases the performance of computer system 212. Computer system 212 becomes a more useful tool in processing resumes as compared to computer systems that do not include resume manager 210. For example, resume manager 210 in computer system 212 is directed to a practical application of processes integrated into resume manager 210 in computer system 212 that identify classifications for sections in electronic resume, associate resume classification codes with the sections based on the classifications, and generate visibility codes for the sections.

In this illustrative example, the use of resume manager 210 in computer system 212 results in improvement identifying resumes that more closely fit or match job openings as compared to current techniques. In this manner, resume manager 210 in computer system 212 provides a practical application of processing electronic resume such that the functioning of computer system 212 is improved to provide more accurate matches between applicants in job openings.

For example, computer system 212 can operate to automatically classify information from the resume and other sources to form electronic resume. Classifications can include categories such as skills, experience, personal information, certifications, accreditations, education, or other. Computer system 212 can assign resume classification codes to the sections based on the classifications of information in sections of electronic resume. Further, computer system 212 can operate to assign visibility codes to the sections. The assignment of visibility codes can be based on input from an applicant. Computer system 212 can also generate an aggregate resume code 242. At least one of the resume classification codes 220 with the aggregate resume code 242 can be used to determine whether electronic resume 204 should be further reviewed for a job opening. As depicted, computer system 212 can generate job classification codes 234 and job profile codes 244 for a job opening. The aggregate resume code in the job profile code can be used to determine whether the resume should be further processed. In further processing, computer system 212 can compare resume classification codes with job classification codes. The comparison to determine how closely electronic resume matches job can be made by comparing resume classification codes and job classification codes using a map.

Further, computer system 212 can establish a secure channel between an organization and an applicant for determining visibility of sections in the resume. In one illustrative example, a deliverable electronic resume is generated and sent to the organization in which visibility is based on agreement between the applicant and the organization. Thus, computer system 212 can operate to further recruitment processes for efficiently as compared to current techniques.

The illustration of a resume management environment and the different components in FIGS. 1-3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a resume classification code in resume classifications codes 220 can comprise a classification code for a section in sections 218 in electronic resume 204 and a value indicating a score for the section in which the classification code and the value form a key value pair. The values can be used as an additional mechanism for generating score 236 for electronic resume 204.

As another example, although not shown in FIG. 2, applicant 206 and requestor 228 perform different actions and generate user input through a data processing system such as a desktop computer, a work station, a tablet, mobile phone, or some other suitable type of data processing system. Further, sources 214 store information such as documents, video, audio, data, spreadsheets, or other suitable forms or data structures using data processing systems or computers that are part of sources 214. These components are present but not shown to avoid obscuring the description of the illustrative example in FIG. 2.

Turning to FIG. 4, a table of resume classification codes is depicted in accordance with an illustrative embodiment. As depicted, table 400 is an example of resume classification codes that can be used to implement resume classification codes 220 in FIG. 2.

As depicted, column 402 identifies classifications of sections in an electronic resume. Column 404 contains the resume classification codes used for the classifications of sections in the electronic resume.

In this illustrative example, row 406 contains a resume classification code for skills on high or more general level. These skills can be classified more specifically using resume classification codes in which the classification code in row 408 identifies technical skills, row 410 identifies functional skills, and row 412 identifies management skills. In a similar fashion, education can be identified using the resume classification code in row 414. More specific education can be identified using resume classification codes such as those in row 416 identifying graduate, row 418 identifying postgraduate, and row 420 identifying doctorate level education.

In FIG. 5, a table of classification codes is depicted in accordance with an illustrative embodiment. In this example, table 500 illustrates examples of classification codes that can be used to implement job classification codes 234 in FIG. 2.

In this illustrative example, column 502 identifies categories in a job description for a job opening. Column 504 contains job classification codes for the different categories.

As depicted, row 506 contains a job profile code for skills and experience. Row 508 contains a job profile code for required technical skills and experience. Row 510 includes a job profile code for preferred technical skills and experience. Next, row 512 contains the job profile code for education in general. Row 514 contains a job profile code that is used to identify required education and row 516 contains a job profile code that identifies preferred education.

The illustration of the resume classification codes in table 400 in FIG. 4 and job classification codes in table 500 in FIG. 5 are provided for illustrating examples of resume classification codes 220 and job classification codes 234 shown in block form in FIG. 2 and are not meant to limit manner in which classification codes can be included. For example, a job profile code for benefits can be included in addition to the job classification codes shown in table 500. As another example, more resume classification codes can be included for specific degrees in table 400 in FIG. 4. For example, REDBSEE is education with a bachelor's in electrical engineering, REDMSEE is education with a master's in electrical engineering, and MSCE is education with a masters in computer engineering. Similar specific job classification codes can be used in addition to those in table 500 in FIG. 5.

With reference now to FIG. 6, an illustration of a resume is depicted in accordance with an illustrative embodiment. As depicted, resume 600 is a visualization of an electronic resume that can be displayed on a display system in computer system 212 in FIG. 2. Resume 600 is an example of information organized into sections for an applicant. These sections can be classified by resume manager 210.

In this illustrative example, the classifications of the sections are work experience 602, skills 604, education 606, projects 608, languages 610, and interests 612. With these classifications, resume classification codes can be associated with the sections such as those in table 400 in FIG. 4. Examples of classification codes for the sections are as follows: work experience 602 is RXP, skills 604 is RSK, education 606 is RED, projects 608 is RPJ, languages 610 is RLN, and interests 612 is RIN. Some sections can be further classified into subsections. For example, skills 604 can include subsections, such as functional skills 620 and technical skills 622. The resume classification codes for functional skills 620 is RXPFS and technical skills 622 is RXPTS.

Turning next to FIG. 7, an illustration of a job opening is depicted in accordance with an illustrative embodiment. As depicted, job opening 700 is a visualization of a job opening such as job opening 208 that can be displayed on a display system in computer system 212 in FIG. 2.

As depicted, job opening 700 includes sections that can be categorized and associated with job classification codes. The job classification codes can be, for example, job classification codes illustrated in table 500 in FIG. 5. In this illustrative example, the sections in job opening 700 include title 702, responsibilities 704, desired experience 706, qualifications 708, preferred education 710, and job categories 712. As depicted, the sections can be associated with job classification codes. For example, title 702 is JT, responsibilities 704 is JR, desired experience 706 is JPTPXP, eligibility 708 is JER, preferred education 710 is WED, and job category 712 is JC.

The illustration of resume 600 and job opening 700 are presented as illustrations of how these data structures can be visualized and not meant to limit manner the content or sections that can be found an electronic resume for a job opening. Other numbers of sections can be present in addition to or in place of ones illustrated. For example, resume 600 can also include sections for organizations, certifications, management skills, or other sections in addition to or in place of the ones depicted.

Figure 8:
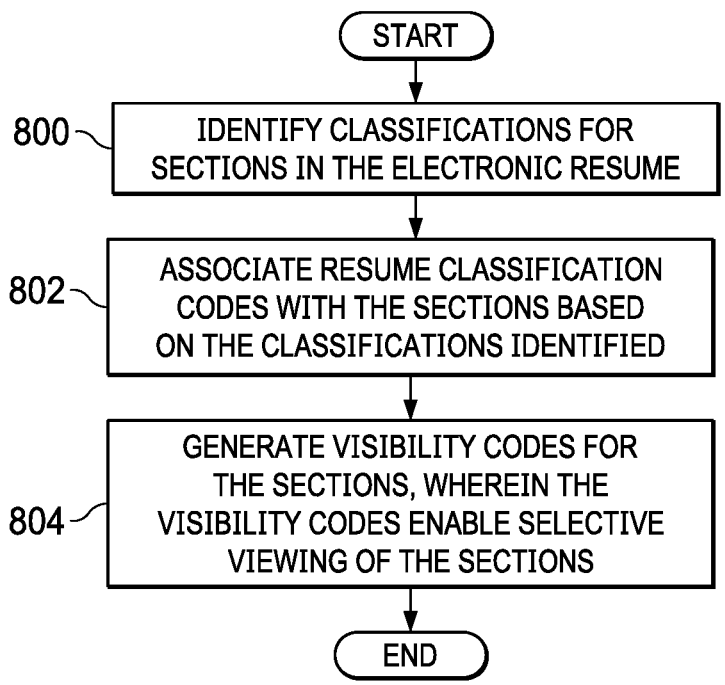
FIG. 8 is a flowchart of a process for processing an electronic resume in accordance with an illustrative embodiment.

Turning next to FIG. 8, a flowchart of a process for processing electronic resumes is depicted in accordance with an illustrative embodiment. The process in FIG. 8 can be implemented in hardware, software, or both. When implemented in software, the process can take the form of program code that is run by one or more processor units located in one or more hardware devices in one or more computer systems. For example, the process can be implemented in resume manager 210 in computer system 212 in FIG. 2.

The process begins by identifying classifications for sections in the electronic resume (step 800). The classifications are based on content in the sections. The resume classification codes are associated with the sections based on the classifications identified (step 802). The resume classification codes enable matching the electronic resume to a job opening.

The process generates visibility codes for the sections, wherein the visibility codes enable selective viewing of the sections (step 804). The process terminates thereafter.

Figure 9:
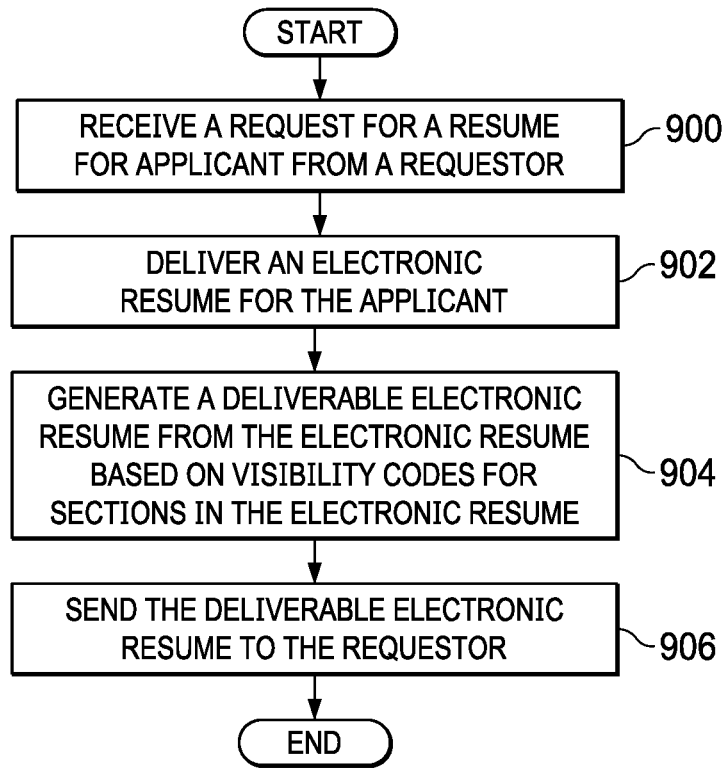
FIG. 9 is a flowchart of a process for generating a deliverable electronic resume in accordance with an illustrative embodiment.

Turning next to FIG. 9, a flowchart of a process for generating a deliverable electronic resume is depicted in accordance with an illustrative embodiment. The process in FIG. 9 can be implemented in hardware, software, or both. When implemented in software, the process can take the form of program code that is run by one or more processor units located in one or more hardware devices in one or more computer systems. For example, the process can be implemented in resume manager 210 in computer system 212 in FIG. 2.

Process begins by receiving a request for a resume for applicant from a requestor (step 900). The process identifies an electronic resume for the applicant (step 902). The process generates a deliverable electronic resume from the electronic resume based on visibility codes for sections in the electronic resume (step 904). The visibility codes can have default values for controlling the visibility of sections in the electronic resume. In other illustrative examples, visibility codes also can be based on the identity of the requestor, user input, or in some other manner.

The process sends the deliverable electronic resume to the requestor (step 906). The process terminates thereafter.

Figure 10:
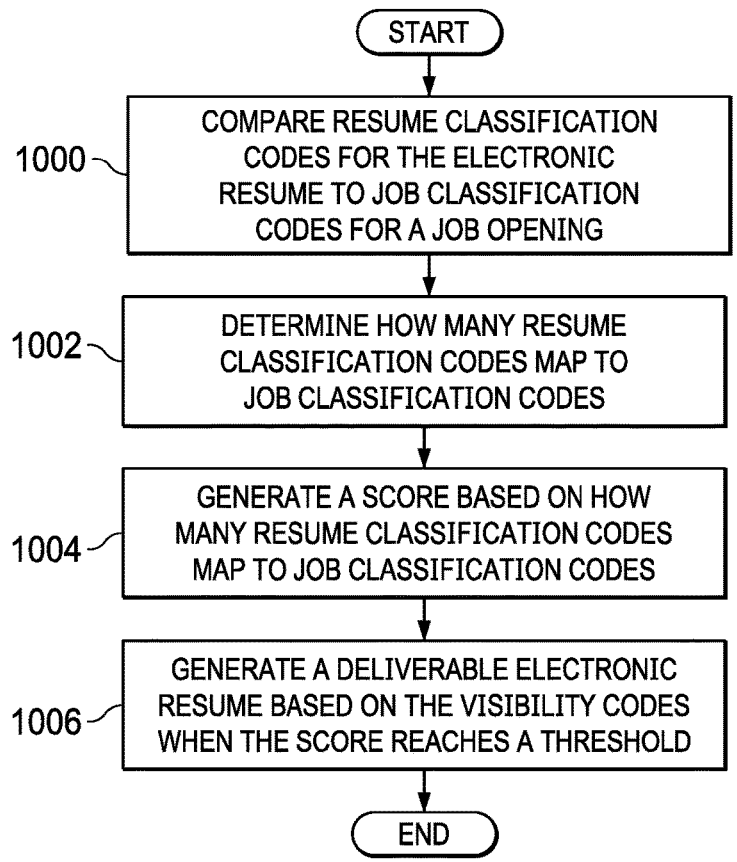
FIG. 10 is a flowchart of a process for generating a deliverable electronic resume in accordance with an illustrative embodiment.

With reference to FIG. 10, a flowchart of a process for generating a deliverable electronic resume is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process can be implemented in resume manager 210 in computer system 212 in FIG. 2.

The process begins by comparing resume classification codes for the electronic resume to job classification codes for a job opening (step 1000). The process determines how many resume classification codes map to job classification codes (1002). A resume classification code maps to a job profile code when the codes. For example, the resume classification code RED maps to the job profile code JED.

The process generates a score based on how many resume classification codes map to job classification codes (step 1004). The score can be based on how many resume classification codes map to job classification codes. The score can also be based on whether particular resume classification codes map to job classification codes. Some resume classification codes may be required or preferred for the job opening. Preferred resume classification codes can be given a higher weight in generating a score than a resume classification code that is not preferred.

The process generates a deliverable electronic resume based on the visibility codes when the score reaches a threshold (step 1006). The process terminates thereafter. The deliverable electronic resume generated in this process can be to a requestor such as a recruiter or organization.

Figure 11:
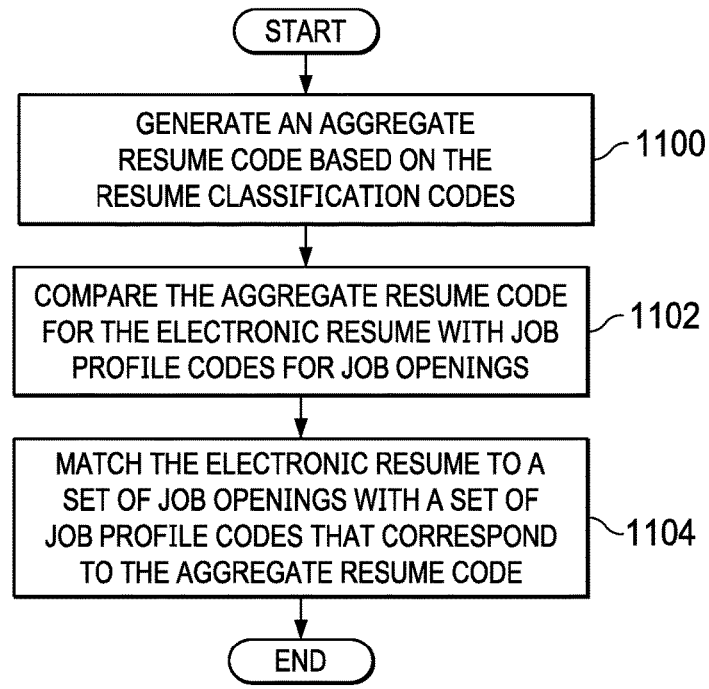
FIG. 11 is a flowchart of a process for identifying job openings in accordance with an illustrative embodiment.

Turning now to FIG. 11, a flowchart of a process for identifying job openings is depicted in accordance with an illustrative embodiment. The process in FIG. 11 can be implemented in hardware, software, or both. When implemented in software, the process can take the form of program code that is run by one or more processor units located in one or more hardware devices in one or more computer systems. For example, the process can be implemented in resume manager 210 in computer system 212 in FIG. 2.

The process beings by generating an aggregate resume code based on the resume classification codes (step 1100). The aggregate resume code generated in step 1100 enables matching the electronic resume with a job opening having a corresponding job profile code. The process compares the aggregate resume code for the electronic resume with job profile codes for job openings (step 1102).

The process matches the electronic resume to a set of job openings with a set of a job profile codes that correspond to the aggregate resume code (step 1104). The set of aggregate profile codes is based on a set of job descriptions for the set of jobs openings. The process terminates thereafter.

Figure 12:
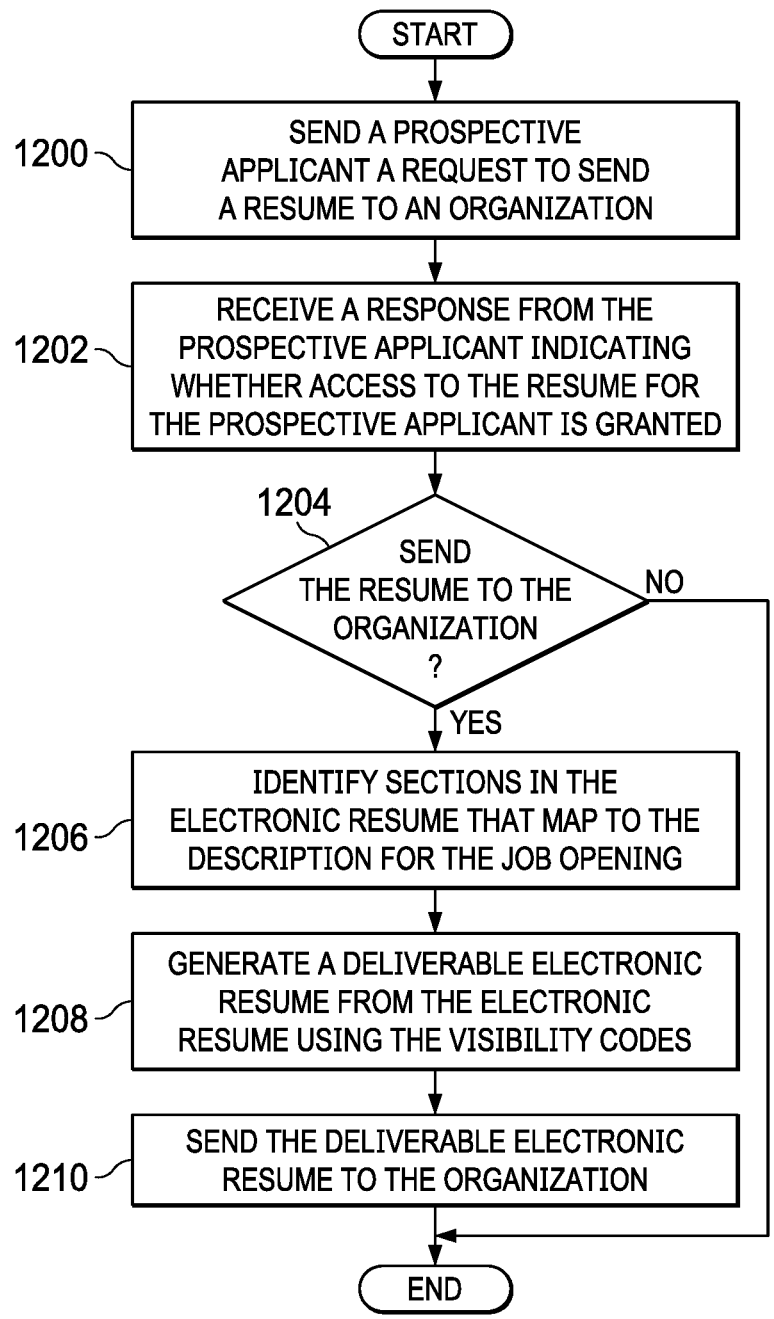
FIG. 12 is a flowchart of a process for setting visibility codes in accordance with an illustrative embodiment.

Turning now to FIG. 12, a flowchart of a process for setting visibility codes is depicted in accordance with an illustrative embodiment. The process in FIG. 12 can be implemented in hardware, software, or both. When implemented in software, the process can take the form of program code that is run by one or more processor units located in one or more hardware devices in one or more computer systems. For example, the process can be implemented in resume manager 210 in computer system 212 in FIG. 2.

The process begins by sending a prospective applicant a request to send a resume to an organization (step 1200). The process receives a response from the prospective applicant indicating whether access to the resume for the prospective applicant is granted (step 1202). A determination is made as to whether to send the resume to the organization (step 1204).

If the resume is to be sent to the organization, the process identifies sections in the electronic resume that map to the description for the job opening (step 1206). In step 1206, visibility codes for resume classification codes that map to job classification codes for the job opening are set to visible. The process generates a deliverable electronic resume from the electronic resume using the visibility codes (step 1208).

The process sends the deliverable electronic resume to the organization (step 1210). The process terminates thereafter.

In step 1210, the deliverable electronic resume can be sent directly to the organization, through a recruiter, or through an employment website. With reference again to step 1204, if the resume is not to be sent to the organization, the process also terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Thus, the different illustrative examples provide a flow for processing resumes. In one illustrative example, a job opening is created and posted. For example, posting may have a job classification code of JRSXP for skills. A candidate uploads a resume to apply for the job opening. The resume is converted to an electronic resume in which sections are classified and assigned resume classification codes. For example, electronic resume can have RSK as skills. A mapping of the resume classification codes to job classification codes is performed by the resume. A score is generated and can be displayed to a person evaluating the resume such as a recruiter handling the job opening for an organization.

In this illustrative example, the recruiter can send a request to the applicant based on the score. The request can request visibility of selected sections in the electronic resume based on the job opening. The applicant can acknowledge the request by verifying the recruiter identifier and the aggregate resume code sent from the recruiter. The applicant knows that the aggregate resume code is for the applicant's electronic resume. The acknowledgement from the applicant can grant access to a requested section by sending the visibility code matching the code stored by the resume. In other words, the visibility code can act as a password used to determine whether the section will be visible when a deliverable electronic resume is generated. The visibility code can also be time-restricted i.e. upon expiring, the interval the section will be made unavailable and the code will be changed.

Upon receipt of the acknowledgement from the applicant, the recruiter can perform actions to send the deliverable electronic resume to the organization posting the job opening. In this manner, the resume can be exchanged in a more secure manner as compared to current techniques when resumes are not classified by sections visibility codes on client specifications. In other words, a resume does not have to actually be sent until agreement is reached as to what sections should be visible to the organization that is to receive the deliverable electronic resume.

Figure 13:
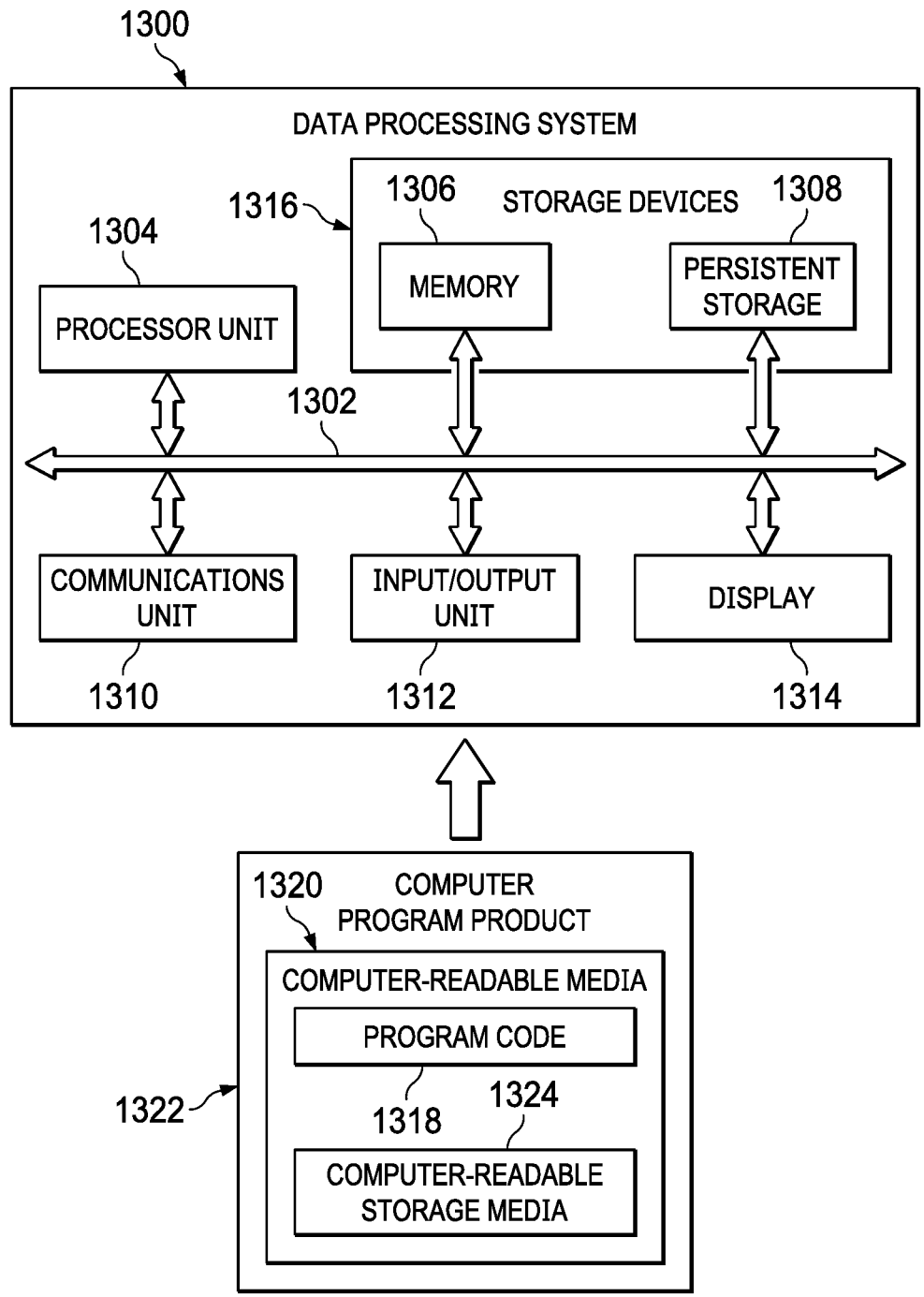
FIG. 13 is a block diagram of a data processing system in accordance with an illustrative embodiment.

Turning now to FIG. 13, a block diagram of a data processing system is depicted in accordance with an illustrative embodiment. Data processing system 1300 can be used to implement server computer 104, server computer 106, server computer 107, client devices 110, in FIG. 1. Data processing system 1300 can also be used to implement computer system 212. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor. For example, processor unit 1304 may be implemented using one or more heterogeneous processor systems in which a main processor is present with secondary processors on a single chip. As another illustrative example, processor unit 1304 can be a symmetric multi-processor system containing multiple processors of the same type on a single chip.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, can be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which may be located in a memory, such as memory 1306.

These instructions are referred to as program code, computer usable program code, or computer-readable program code that can be read and executed by a processor in processor unit 1304. The program code in the different embodiments can be embodied on different physical or computer-readable storage media, such as memory 1306 or persistent storage 1308.

Program code 1318 is located in a functional form on computer-readable media 1320 that is selectively removable and can be loaded onto or transferred to data processing system 1300 for execution by processor unit 1304. Program code 1318 and computer-readable media 1320 form computer program product 1322 in these illustrative examples. In the illustrative example, computer-readable media 1320 is computer-readable storage media 1324.

In these illustrative examples, computer-readable storage media 1324 is a physical or tangible storage device used to store program code 1318 rather than a medium that propagates or transmits program code 1318.

Alternatively, program code 1318 can be transferred to data processing system 1300 using a computer-readable signal media. The computer-readable signal media can be, for example, a propagated data signal containing program code 1318. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1300 are not meant to provide architectural limitations to the manner in which different embodiments can be implemented. In some illustrative examples, one or more of the components may be incorporated in or otherwise form a portion of, another component. For example, memory 1306, or portions thereof, may be incorporated in processor unit 1304 in some illustrative examples. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program code 1318.

Thus, illustrative embodiments of the present invention provide a computer implemented method, computer system, and computer program product processing an electronic resume. In one illustrative example, classifications are identified for sections in the electronic resume. Resume classification codes are associated with the sections based on the classifications identified, wherein the resume classification codes enable matching the electronic resume to a job opening. Visibility codes are generated for the sections. The visibility codes enable selective viewing of the sections. The resume classification codes are associated corresponding sections in the electronic resume.

In one illustrative example a computer system with a resume manager can operate to automatically classify information from the resume and other sources to form an electronic resume. Classifications can include categories such as skills, experience, personal information, certifications, accreditations, education, or other. The computer system can assign resume classification codes to the sections based on the classifications of information in sections of electronic resume.

Further, in the illustrative example, the computer system can operate to assign visibility codes to the sections. The assignment visibility codes can be based on input from an applicant. The visibility codes are used to determine what sections in the electronic resume is visible to a recipient of the electronic resume.

The computer system can also generate an aggregate resume code. At least one of the resume classification codes with the aggregate resume code can be used to determine whether electronic resume should be further reviewed or processed for a job opening. As depicted, the computer system can generate job classification codes and job profile code for a job opening. The aggregate resume code in the job profile code can be used to determine whether the resume should be further processed. The computer system can compare resume classification codes with job classification codes. The comparison to determine how closely electronic resume matches job can be made by comparing resume classification codes and job classification codes using a map.

In the illustrative example, the computer system can establish a secure channel between an organization and an applicant for determining visibility of sections in the resume. In one illustrative example, a deliverable electronic resume is generated and sent to the organization in which visibility is based on agreement between the applicant and the organization. Thus, the computer system with the resume manager can operate to further recruitment processes for efficiently as compared to current techniques. Further, with the use of resume classification codes and visibility codes, an electronic resume can be controlled to reduce copying for unauthorized viewing of particular sections in the electronic resume.

The descriptions of the various embodiments of the present invention have been presented for purposes of illustration, but are not intended to be exhaustive or limited to the embodiments disclosed. Not all embodiments will include all of the features described in the illustrative examples. Further, different embodiments can include different features described in the illustrative examples. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for processing an electronic resume, the method comprising:
identifying, by a computer system, at least one classification for each section in the electronic resume to form classifications, wherein the classifications are based on content in the sections, wherein the classifications comprise at least two of work experience, skill set and education;
associating, by the computer system, resume classification codes with the sections based on the classifications identified, wherein the resume classification codes enable matching the electronic resume to a job opening;
identifying, by the computer system, a respective set of job classification codes for each of a plurality of job openings, wherein each job classification code is determined based on content of a job opening;
generating, by the computer system, an aggregate resume code based on the resume classification codes corresponding to the plurality of resume sections;
comparing, by the computer system, the aggregate resume code with the sets of job classification codes for the plurality of job openings; and
matching, by the computer system, the electronic resume to a set of the job openings, wherein a matching job opening has a set of job classification codes that correspond to the aggregate resume code;
generating, by the computer system, visibility codes for each of the sections in the electronic resume;
determining, by the computer system, a subset of the sections of the electronic resume by comparing the visibility codes of each section with an access level of a requestor for a particular job opening,
generating, by the computer system, a deliverable electronic resume containing the determined subset of sections and excluding sections of the electronic resume that are not in the subset; and
displaying, by the computer system, the deliverable electronic resume to the requestor.

2. The method of claim 1 further comprising:
generating, by the computer system, a score for the particular job opening, based on the number of resume classification codes for the electronic resume that map to the job classification codes for the particular job opening.

3. The method of claim 2 further comprising: returning, by the computer system, the deliverable electronic resume to a requestor, wherein the deliverable electronic resume is generated based on the visibility codes when the score reaches a threshold.

4. The method of claim 1 further comprising:
identifying, by the computer system, job classification codes for the particular job opening;
wherein the deliverable electronic resume is generated based on sections with resume classification codes that match the job classification codes for the particular job opening.

5. The method of claim 1, wherein a visibility code in the visibility codes further comprises a classification code for a section in the electronic resume and a value indicating whether the section in the electronic resume is visible, wherein the classification code and the value form a key value pair.

6. The method of claim 5, wherein a resume classification code in the resume classification codes comprises the classification code for the section in the electronic resume and the value indicating a score for the section, wherein the classification code and the value form the key value pair, wherein the visibility codes and the resume classification codes are embedded in the electronic resume.

7. A resume management system comprising:
a computer system comprising one or more processors and one or more computer-readable media storing instructions that when executed by the one or more processors cause the computer system to:
identify at least one classification for each section in the electronic resume to form classifications, wherein the classifications are based on content in the sections, wherein the classifications comprise at least two of work experience, skill set and education;
associate resume classification codes with the sections based on the classifications identified, wherein the resume classification codes enable matching the electronic resume to a job opening;
identify a respective set of job classification codes for each of a plurality of job openings, wherein each job classification code is determined based on content of a job opening;
generate an aggregate resume code based on the resume classification codes corresponding to the plurality of resume sections;
compare the aggregate resume code with the sets of job classification codes for the plurality of job openings; and
match the electronic resume to a set of the job openings, wherein a matching job opening has a set of job classification codes that correspond to the aggregate resume code;
generate visibility codes for each of the sections in the electronic resume;
determine a subset of the sections of the electronic resume by comparing the visibility codes of each section with an access level of a requestor for a particular job opening,
generate a deliverable electronic resume containing the determined subset of sections and excluding sections of the electronic resume that are not in the subset; and
display the deliverable electronic resume to the requestor.

8. The resume management system of claim 7, wherein the instructions stored by the computer-readable media when executed by the one or more processors, further cause the computer system to:
generate a score for the particular job opening, based on the number of resume classification codes for the electronic resume that map to job classification codes for the particular job opening.

9. The resume management system of claim 8, wherein the instructions stored by the computer-readable media when executed by the one or more processors, further cause the computer system to:
generate the deliverable electronic resume based on the visibility codes when the score reaches a threshold and return the deliverable electronic resume to a requestor.

10. The resume management system of claim 7, wherein the instructions stored by the computer-readable media when executed by the one or more processors, further cause the computer system to:
identify job classification codes for the particular job opening, wherein the deliverable electronic resume is generated based on sections with resume classification codes that match the job classification codes for the particular job opening.

11. The resume management system of claim 7, wherein a visibility code in the visibility codes further comprises a classification code for a section in the electronic resume and a value indicating whether the section in the electronic resume is visible, wherein the classification code and the value form a key value pair.

12. The resume management system of claim 11, wherein a resume classification code in the resume classification codes comprises a classification code for a section in the electronic resume and a value indicating a score for the section in which the classification code and the value form a key value pair, wherein the visibility codes and the resume classification codes are embedded in the electronic resume.

13. A computer program product for processing an electronic resume, the computer program product comprising:
a computer-readable storage media;

first program code, stored on the computer-readable storage media, for at least one classification for each section in the electronic resume, wherein the classifications are based on content in the sections, wherein the classifications comprise at least two of work experience, skill set and education;

second program code, stored on the computer-readable storage media, for associating resume classification codes with the sections based on the classifications identified, wherein the resume classification codes enable matching the electronic resume to a job opening;

third program code, stored on the computer-readable storage media, for identifying, by the computer system, a respective set of job classification codes for each of a plurality of job openings, wherein each job classification code is determined based on content of a job opening;

fourth program code, stored on the computer-readable storage media, for generating, by the computer system, an aggregate resume code based on the resume classification codes corresponding to the plurality of resume sections;

fifth program code, stored on the computer-readable storage media, for comparing, by the computer system, the aggregate resume code with the sets of job classification codes for the plurality of job openings;

sixth program code, stored on the computer-readable storage media, for matching, by the computer system, the electronic resume to a set of the job openings, wherein a matching job opening has a set of job classification codes that correspond to the aggregate resume code;

seventh program code, stored on the computer-readable storage media, for generating visibility codes for each of the sections in the electronic resume;

eighth program code, stored on the computer-readable storage media, for determining, by the computer system, a subset of the sections of the electronic resume by comparing the visibility codes of each section with an access level of a requestor for a particular job opening, ninth program code, stored on the computer-readable storage media, for generating a deliverable electronic resume containing the determined subset of sections and excluding sections of the electronic resume that are not in the subset; and tenth program code, stored on the computer-readable storage media, for displaying, by the computer system, the deliverable electronic resume to the requestor.

14. The computer program product of claim 13 further comprising: eleventh program code, stored on the computer-readable storage media, for generating a score for the particular job opening, based on the number of resume classification codes that map for the electronic resume to the job classification codes for the particular job opening; and twelfth program code, stored on the computer-readable storage media, for returning the deliverable electronic resume to a requestor, wherein the deliverable electronic resume is generated based on the visibility codes when the score reaches a threshold.

* * * * *